(12) United States Patent
Kim

(10) Patent No.: US 12,099,114 B2
(45) Date of Patent: Sep. 24, 2024

(54) METHOD AND DEVICE FOR PROCESSING SAR RAW DATA

(71) Applicant: KOREA AEROSPACE RESEARCH INSTITUTE, Daejeon (KR)

(72) Inventor: Dong Hyun Kim, Daejeon (KR)

(73) Assignee: Korea Aerospace Research Institute, Daejeon (KR)

(*) Notice: Subject to any disclaimer, the term of this patent is extended or adjusted under 35 U.S.C. 154(b) by 558 days.

(21) Appl. No.: 17/414,815

(22) PCT Filed: Nov. 14, 2019

(86) PCT No.: PCT/KR2019/015504
§ 371 (c)(1),
(2) Date: Jun. 16, 2021

(87) PCT Pub. No.: WO2020/130362
PCT Pub. Date: Jun. 25, 2020

(65) Prior Publication Data
US 2022/0026564 A1    Jan. 27, 2022

(30) Foreign Application Priority Data
Dec. 17, 2018 (KR) .................. 10-2018-0163257

(51) Int. Cl.
G01S 13/90    (2006.01)
G06T 5/10    (2006.01)
G06T 7/11    (2017.01)

(52) U.S. Cl.
CPC ....... *G01S 13/9011* (2013.01); *G01S 13/9054* (2019.05); *G01S 13/9056* (2019.05);
(Continued)

(58) Field of Classification Search
CPC ............. G01S 13/9011; G01S 13/9056; G01S 13/9054; G06T 7/11; G06T 5/10;
(Continued)

(56) References Cited

U.S. PATENT DOCUMENTS 5,179,383 A * 1/1993 Raney ................. G01S 13/9011
342/25 D
6,222,933 B1   4/2001 Mittermayer et al.
(Continued)

FOREIGN PATENT DOCUMENTS

CA    2691788 A1 * 1/2009 ......... G01S 13/9035
DE    0924534 A2 * 6/1999 ........... G01S 13/904
(Continued)

OTHER PUBLICATIONS

Liu, Yue et al., "An Extended Inverse Chirp-Z Transform Algorithm to Process High Squint SAR Data", Progress in Electromagnetics Research, vol. 138, 555-569, Dec. 31, 2013.
(Continued)

*Primary Examiner* — Vladimir Magloire
*Assistant Examiner* — Maxine McKenzie Phillips
(74) *Attorney, Agent, or Firm* — Rabin & Berdo, P.C.

(57) ABSTRACT

A method according to the present invention comprises the steps of: dividing SAR raw data into one or more sub-aperture data by a predetermined number in an azimuth direction; performing a spectral length extension FFT on the sub-aperture data in the azimuth direction; multiplying the sub-aperture data by a chirp scaling function; performing a range FFT on the sub-aperture data; performing range compression, SRC, and a bulk RCMC on the sub-aperture data; performing an inverse chirp-z transform on the sub-aperture data in a range direction; multiplying the divided sub-aperture data by a predetermined first function; performing an IFFT on the sub-aperture data in the azimuth direction;
(Continued)

recombining the sub-aperture data; multiplying the recombined data by a second function and deramping same; performing an azimuth FFT on the recombined data; performing an azimuth IFFT on the recombined data; multiplying the recombined data by a third function and deramping same; performing the azimuth FFT on the recombined data; performing azimuth compression by multiplying the recombined data by a fourth function; performing an azimuth inverse chirp-z transform on the recombined data; and multiplying the recombined data by a fifth function for phase preservation.

1 Claim, 5 Drawing Sheets

(52) U.S. Cl.
CPC .............. *G06T 5/10* (2013.01); *G06T 7/11* (2017.01); *G06T 2207/10044* (2013.01); *G06T 2207/20021* (2013.01); *G06T 2207/20056* (2013.01)

(58) Field of Classification Search
CPC . G06T 2207/10044; G06T 2207/20021; G06T 2207/20056
See application file for complete search history.

(56) References Cited

U.S. PATENT DOCUMENTS

2010/0158050 A1\* 6/2010 Yang ................... H04L 27/2647
370/498
2010/0207808 A1 8/2010 Prats et al.

FOREIGN PATENT DOCUMENTS

DE 102017223429 A1 \* 7/2018
KR 1687658 B1 \* 12/2016 ............. G06F 17/10

OTHER PUBLICATIONS

Moreira, Alberto et al., "Extended Chirp Scaling Algorithm for Air- and Spaceborne SAR Data Processing in Stripmap and ScanSAR Imaging Modes", IEEE Transactions on Geoscience and Remote Sensing, vol. 34, No. 5, Sep. 30, 1996.

Prats, Pau et al., "Processing of Sliding Spotlight and Tops SAR Data Using Baseband Azimuth Scaling", IEEE Transactions on Geoscience and Remote Sensing, vol. 48, No. 2, Feb. 2010, pp. 770-780.

Prats-Iraola, Pau et al., "On the Processing of Very High-Resolution Spaceborne SAR Data", IEEE Transactions on Geoscience and Remote Sensing, vol. 52, No. 10, Feb. 4, 2014.

\* cited by examiner (SAR raw data) $\checkmark s_0(\tau, \eta) = A_0 w_r \left(\tau - \frac{2R(\eta)}{c}\right) w_a(\eta - \eta_c)$
$\times exp\{-j4\pi f_0 R(\eta)/c\} \times exp\left\{j\pi K_r \left(\tau - \frac{2R(\eta)}{c}\right)^2\right\}$ ↓ focusing (SAR processed image data) $\checkmark s_n(\tau, \eta) = A_n \times sinc\left\{B_e\left(\tau - \frac{2R_c}{c}\right)\right\} \times sinc\{B_a(\eta - \eta_0)\}$

METHOD AND DEVICE FOR PROCESSING SAR RAW DATA

CROSS-REFERENCE TO RELATED APPLICATIONS

This application claims priority from Korean Patent Application No. 10-2018-0163257, filed on Dec. 17, 2018 in the Korean Intellectual Property Office, the invention of which is incorporated herein by reference in its entirety.

BACKGROUND

Technical Field

The present invention relates to a method for generating single look complex (SLC) data by processing synthetic aperture radar image (SAR) raw data.

Background Art

The synthetic aperture radar image (SAR) system consists of a hardware payload (payload-sensor), a bus (satellite) and a software terrestrial image processing system. The output of the SAR system is a two-dimensional SAR image product for a desired area, and the better quality of this data can lead to an increased usefulness of additional information obtained therefrom. In order to generate a high-quality SAR video product, it is possible to increase the investment in hardware performance or design, but in this case, a considerable cost is required.

The SAR raw data obtained by the SAR satellite in any observation mode are two-dimensional data including the real part and the imaginary part, which are information data of the complex number. The SAR satellite performs observation by side looking. The flight direction of the satellite is called the azimuth or along-track. In addition, the direction the satellite's antenna is facing is called the range or cross-track. The SAR raw data are two-dimensional data formed in azimuth and range direction.

In general, the main function of the SAR processing (SARP) core algorithm is to form an image from the SAR raw data as illustrated in FIG. 1.

FIG. 1 is a diagram illustrating an image formation process of the SARP core algorithm.

In the SARP core algorithm, focusing corresponds to a process of transforming the mathematical model of the raw data for any point target within the observed area and forming two-dimensional image information about the point target.

FIG. 2 is an example of representing SARP focusing by mathematical modeling.

In FIG. 2, $\eta$ is an azimuth time, $\tau$ is a range time, c is a luminous flux (m/sec), and $\eta_c$ is an azimuth time at which the beam center crosses the point target, $f_0$ is a carrier frequency, R is a slant range, and $K_r$ is a chirp rate.

FIG. 3 is a diagram illustrating a focusing process of the SARP core algorithm.

As illustrated in FIG. 3, the process of focusing raw data on any point target is performed through processes of ① range compression (i.e., compression of SAR raw data in the range direction), ② range interpolation (i.e., interpolation in the range direction), and ③ azimuth compression (i.e., compression in the azimuth direction).

The baseband azimuth scaling algorithm (BAS) [Paper 1: Pau Prats, Member, IEEE, Rolf Scheiber, Josef Mittermayer, Member, IEEE, Adriano Meta, Member, IEEE, and Alberto Moreira, Fellow, IEEE, "Processing of Sliding Spotlight and TOPS SAR Data Using Baseband Azimuth Scaling," IEEE Trans. Geosci. Remote Sens., vol. 48, no. 2, pp. 770-780, Febru. 2010.], known as one of the most advanced technologies among conventional SARP core algorithms, also performs the SAR raw data processing as in the general SARP core algorithm illustrated in FIG. 2.

For the range direction processing (range cell migration correction, secondary range compression, and range compression), the BAS applies the ECS algorithm method in [A. Moreira, J. Mittermayer, and R. Scheiber, "Extended chirp scaling algorithm for air- and spaceborne SAR data processing in stripmap and ScanSAR imaging modes," IEEE Trans. Geosci. Remote Sens., vol. 34, no. 5, pp. 1123-1136, September 1996.], which is the reference [6] of Paper 1, and may use the corresponding part of any commonly known SARP core algorithm.

The processes and characteristics of the conventional BAS processing will be described in detail.

The BAS suggests the technical method of azimuth processing, and the range processing applies the same method as the conventional ECS.

FIG. 4 is a diagram showing a process of Sliding spotlight and TOPS SAR data processing using the conventional BAS.

Referring to FIG. 4, the baseband azimuth scaling (BAS) includes $H_4$, $H_5$, $H_6$ and $H_7$ of the SARP core algorithm. The key points are $H_4$ and $H_5$. This is because $H_6$ and $H_7$ are the remaining components formed from natural mathematical evolution by $H_4$ and $H_5$.

$$H_4(f_a, r) = \exp\left[j\frac{4\pi}{\lambda}r \cdot (\beta(f_a, r) - 1)\right] \cdot \exp[-j2\pi f_a t_v(r)] \cdot \exp\left[-j\frac{\pi}{K_{scl}(r)}f_a^2\right]$$

$\lambda$: wavelength
r: closest approach range
$f_a$: azimuth frequency (Doppler frequency shift)

$$\beta(f_a, r) = \sqrt{1 - \left(\frac{\lambda f_a}{2 v_{\mathit{eff}}(r)}\right)^2}$$

$v_{\mathit{eff}}$: effective velocity
$t_v(r)$: time shift $$K_{scl}(r) = -\frac{2 v_{\mathit{eff}}^2(r_{mid})}{\lambda r_{scl}(r)} :$$

scaling Doppler rate $$r_{scl}(r) = \frac{r_{scl0}}{r_{rot0}} r_{rot}(r)$$

$$r_{rot}(r) = \frac{r_{rot0} - r}{1 - \frac{r_{scl0}}{r_{rot0}}}$$

$r_{scl0}$: scaling range selected for controlling azimuth image sampling
$r_{rot0}$: distance to the beam rotation center given by the geometry $$H_5(t_a, r) = \exp[-j\pi K_{rot}(r) \cdot (t_a - t_{mid})^2],$$

$t_a$: azimuth time $$K_{rot}(r) = -\frac{2v_{eff}^2(r_{mid})}{\lambda r_{rot}(r)};$$

azimuth derotation Doppler rate $t_{mid}$: selected derotation center azimuth time $$H_6(f_a, r) = w(f_a) \cdot \exp\left[j\frac{\pi}{K_{eff}(r)}f_a^2\right]$$

$$K_{eff}(r) = K_{scl}(r) - K_{rot}(r)$$

$$H_7(t_a, r) = \exp\left[j\pi K_t(r) \cdot \left(1 - \frac{r_{scl0}}{r_{rot0}}\right)^2 \cdot (t_a - t_{mid})^2\right]$$

$$K_t(r) = -\frac{2v_{eff}^2(r_{mid})}{\lambda \cdot (r_{rot}(r) - r_{scl}(r))}$$

The conventional BAS has advantages and characteristics of setting a desired value of the azimuth sample spacings of the image while performing proper derotation, by setting $r_{sc1}(r)$ and $r_{rot}(r)$ as described above.

The azimuth sample spacings of the image are processed by the BAS as follows.

$$\Delta x_{final} = \Delta x_{original} \cdot (1 - r_{scl0}/r_{rot0})$$

$\Delta x_{final}$: azimuth sample spacings after processing $\Delta x_{original}$: azimuth sample spacings before processing Meanwhile, the conventional BAS has the following constraints by the core technical components of the algorithm. These constraints make it unsuitable for the processing of data obtained by the operation in the staring spotlight mode and by the operation in the sliding spotlight mode close to the operation in the staring spotlight mode.

Basically, the SARP core algorithm should perform signal processing while satisfying the Nyquist criteria. Otherwise, image distortion occurs. Further, a proper sample spacings compared to the resolution should be set. Otherwise, the efficiency is lowered, and the SARP core algorithm cannot be adopted according to the requiring response time of the SAR system.

There are constraints that the BAS has to overcome in order to function properly: First, the azimuth bandwidth after derotation should satisfy the Nyquist criteria. Second, the Doppler rate after derotation should have a proper large value other than '0'. Third, the azimuth pixel spacings of the processed image should not be too small compared to the azimuth resolution. Fourth, after processing, the azimuth time range of the azimuth scene should not be increased too much. However, for their operation purpose and characteristics, ScanSAR and TOPS modes do not apply these constraints. Fifth, the time shift of the azimuth signal by $H_4$ should not be too large.

Since the first and second constraints are related with the accuracy of image processing, they should always be met. The third to fifth constraints are related with efficiency and processing speed.

Conditions for overcoming the constraints of the BAS may be specified and set as follows. In order to avoid the first, second, and third constraints, Paper 1 sets out that the following conditions should be met.

$$r_{rot0} \geq \frac{r_{scl}}{1 - \gamma \frac{r\theta_{az}}{v_g T_{obs}}}, \gamma \geq 0.8$$

$v_g$: ground beam velocity
$T_{obs}$: observation duration
$\theta_{az}$: azimuth antenna beamwidth The above may be rewritten as follows.

$$\left|\frac{r_{rot0} - r_{scl0}}{r_{rot0}}\right| \leq \gamma \cdot \frac{r\theta_{az}}{v_g T_{obs}}, 1 > \gamma \geq 0.8$$

Since the $$\left|\frac{r_{rot0}}{r_{rot0} - r_{scl0}}\right|$$

value should not be large in order to overcome the fourth constraint, the following condition may be set.

$$\left|\frac{r_{rot0}}{r_{rot0} - r_{scl0}}\right| \cdot \Delta t_{a0} \leq 1.25 \cdot T_a$$

$T_a$: total observation time
$\Delta t_{a0}$: actual length of azimuth time in the scene However, for their operation purpose and characteristics, ScanSAR and TOPS modes do not apply these constraints.

Since the $$t_p(r) = f_a \cdot \left\{\frac{-\lambda(r_{scl}(r) - r)}{2v_{eff}^2(r_{mid})}\right\}$$

value should not be large in order to overcome the fifth constraint, the following condition may be set.

That is, $$|t_v(r)| = \left|f_a \cdot \left\{\frac{-\lambda \cdot \left\{\frac{r_{rot0}(r_{scl0} - r)}{r_{rot0} - r_{scl0}}\right\}}{2v_{eff}^2(r_{mid})}\right\}\right| \leq 0.025 \cdot T_a.$$

As discussed above, the first, second, and third conditions have an opposite relationship with the fourth and fifth conditions.

In the conventional BAS, when $r_{rot0}$ is set according to the observation geometry, there exist the constraints on $r_{scl0}$ listed above. In addition, when image processing is performed on multi-subswaths, $r_{scl0}$ values of the subswaths should be set to have a certain ratio between them in order to match the azimuth pixel spacings between subswaths. As mentioned in Paper 1, when it comes to the staring spotlight mode and the sliding spotlight mode close to the mode operation of the staring spotlight mode, and also the SAR systems having specific performance, it may be difficult to select the BAS as the SARP core algorithm because the BAS does not satisfy those constraints. Further, for the high-resolution SAR system, when the azimuth matched filter of $H_4$ is used as it is, the focusing accuracy may be lowered.

Therefore, the SARP core algorithm of the present invention is required, which overcomes all of the above constraints and is suitable for the high performance SAR system.

SUMMARY

Technical Problem

Therefore, the technical problem to be solved by the present invention is to provide a method for processing SAR raw data according to SARP core algorithm applicable to all of the SAR operational modes including Stripmap, ScanSAR, TOPS, sliding spotlight, staring spotlight, and operational modes between the sliding spotlight and the staring spotlight.

Technical Solution

In order to solve the technical problems mentioned above, a method for processing SAR raw data according to the present invention is provided, which may include dividing synthetic aperture radar image (SAR) raw data into one or more sub-aperture data by a predetermined number in an azimuth direction, performing a spectral length extension fast Fourier transform (FFT) on the divided sub-aperture data in the azimuth direction, multiplying the divided sub-aperture data by a chirp scaling function, performing the FFT on the divided sub-aperture data in a range direction, performing a range compression, a secondary range compression (SRC), and a bulk range cell migration correction (RCMC) on the divided sub-aperture data, performing an inverse chirp-z transform on the divided sub-aperture data in the range direction, multiplying the divided sub-aperture data by a first function predetermined for residual phase correction and azimuth scaling, performing an inverse fast Fourier transform (IFFT) on the divided sub-aperture data in the azimuth direction, recombining the divided sub-aperture data, multiplying the recombined data by a second function to perform deramping, performing the FFT on the recombined data in the azimuth direction, performing the IFFT on the recombined data in the azimuth direction, multiplying the recombined data by a third function to perform deramping, performing the FFT on the recombined data in the azimuth direction, performing an azimuth compression by multiplying the recombined data by a fourth function, performing the inverse chirp-z transform in an azimuth direction on the recombined data, and multiplying the recombined data by a fifth function for phase preservation.

Further, in order to solve the technical problems mentioned above, a computer-readable recording medium storing a program for performing a method for processing the SAR raw data according to the present invention may be provided.

The program may include a plurality of instruction sets for performing the method for processing the SAR raw data described above.

Advantageous Effects

According to the present invention, there may be provided a method for processing SAR raw data according to SARP core algorithm applicable to all of the SAR operational modes including Stripmap, ScanSAR, TOPS, sliding spotlight, staring spotlight, and operational modes between the sliding spotlight and the staring spotlight.

DETAILED DESCRIPTION

Hereinafter, the exemplary embodiments of the present invention will be described in detail with reference to the accompanying drawings for those with ordinary knowledge in the art to be able to easily achieve the present invention.

Figure 1:
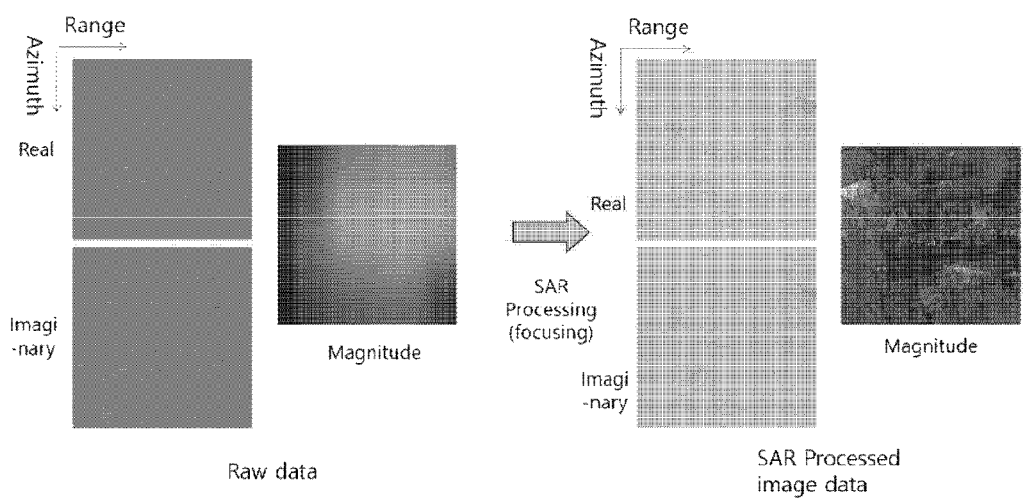
FIG. 1 is a diagram illustrating an image formation process of a SARP core algorithm.
Figure 2:
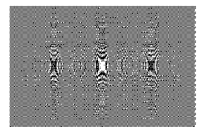
FIG. 2 is an example of representing SARP focusing by mathematical modeling.
Figure 2:
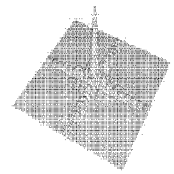
Figure 3:
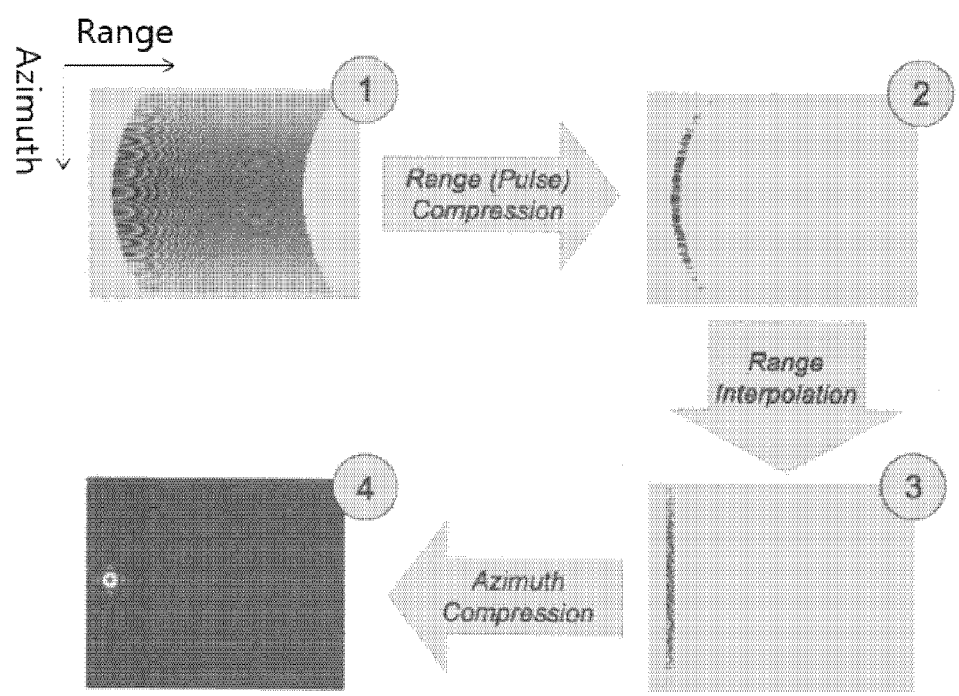
FIG. 3 is a diagram illustrating a focusing process of the SARP core algorithm.
Figure 4:
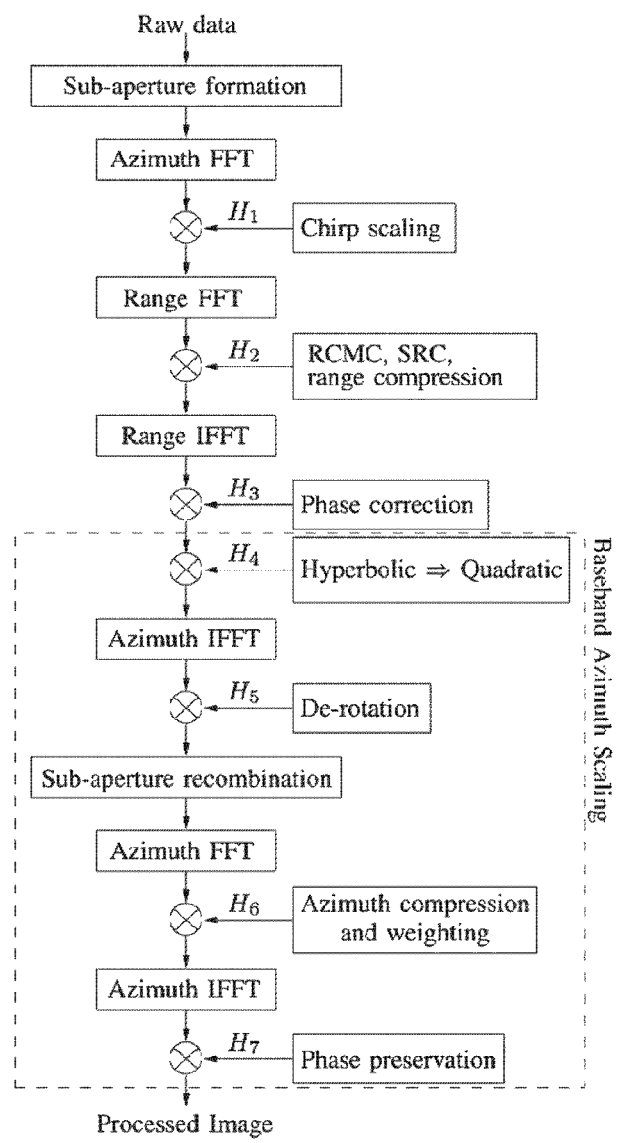
FIG. 4 is a diagram showing a process of Sliding spotlight and TOPS SAR data processing using the conventional BAS.
Figure 5:
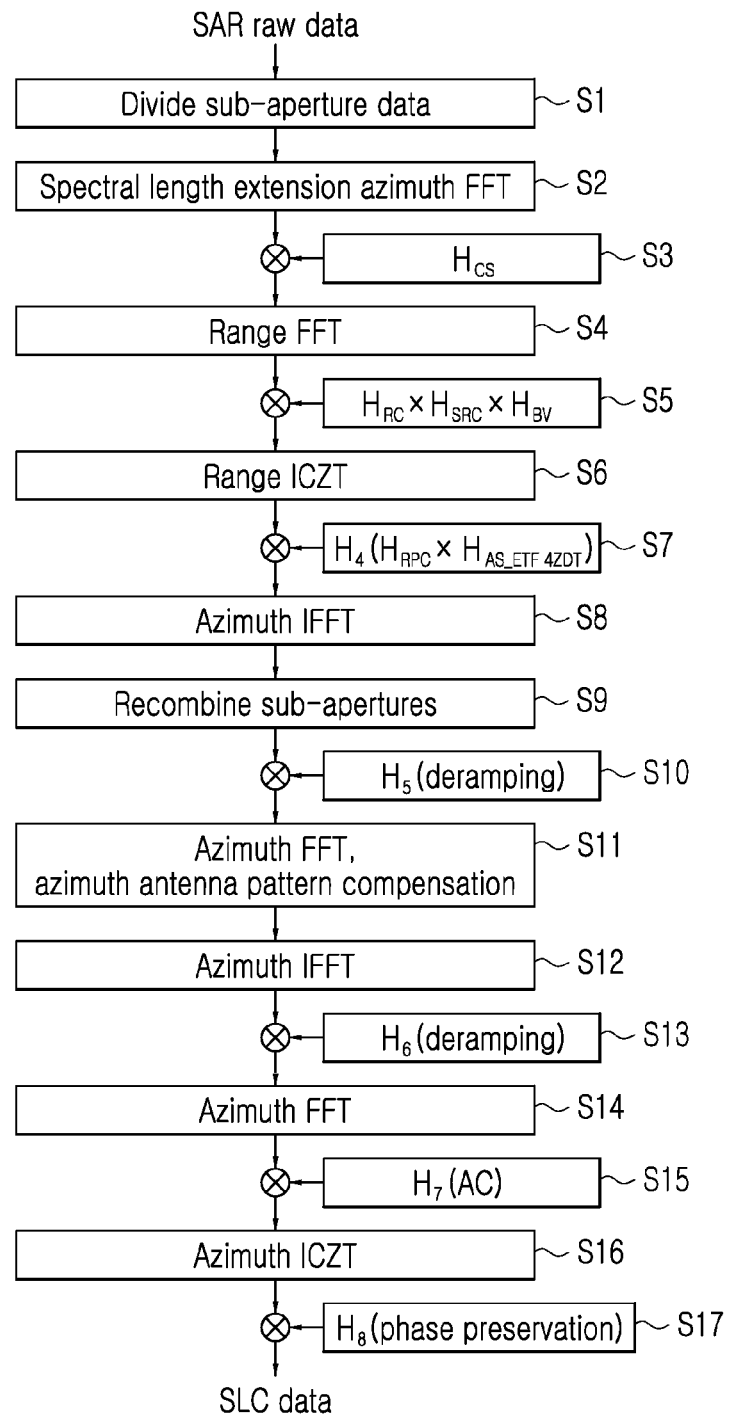
FIG. 5 is a diagram provided to explain a SARP core algorithm according to an embodiment of the present invention.

FIG. 5 is a diagram provided to explain a method for processing SAR raw data by a SARP core algorithm according to an embodiment of the present invention.

Referring to FIG. 5, first, a processor for processing the SAR raw data according to the present invention divides the synthetic aperture radar image (SAR) raw data into one or more sub-aperture data by a predetermined number in an azimuth direction, at S1.

When dividing and processing the SAR raw data based on a sub-aperture unit in the azimuth direction at S1, it is possible that the azimuth time length of one sub-aperture may be set as any value without limitations within the azimuth time length of the entire raw data. This is because the method for converting the data into the azimuth frequency domain while satisfying the Nyquist criteria is not a short azimuth FFT but a spectral length extension azimuth FFT. The number of sub-apertures may be set in consideration of the beam or operational mode of the designed SAR system. At S1, the number of sub-apertures may be set to a minimum value of 1 or 2 or more. The azimuth time length of the sub-aperture is determined according to the set number of sub-apertures.

When the short azimuth FFT is used, the processing accuracy of the SARP may be lowered for a certain SAR system. This is because the algorithm of the SARP is developed in the principle of stationary phase (POSP) manner and thus there is an error in approximation, and the error is increased as the time bandwidth product (TBP) value is decreased, and the short FFT decreases the TBP value. In addition, the short azimuth FFT method increases the number of sub-apertures, resulting in lowered quality of the image in a part where the sub-aperture images are recombined. On the other hand, the SARP core algorithm according to the present invention minimizes the number of sub-apertures while allowing adjustment, thereby ensuring maximum accuracy in the process of processing the signal for any SAR system. The shortcoming of this method can be that the processing time is increased due to the additional spectral length extension process, but this is acceptable when considering that the method can be applied to the entire operational modes.

Next, at S2, the spectral length extension azimuth FFT may be performed on the sub-aperture data divided at S1. Through S2, the sub-aperture data may be converted from the SAR signal domain into the azimuth frequency domain.

After performing S2, chirp scaling may be performed by multiplying the sub-aperture data converted into the frequency domain by a chirp scaling function ($H_{cs}$), at S3.

After performing S3, a range FFT may be performed on the divided sub-aperture data in a range direction, at S4. The sub-aperture data divided through S4 may be converted into a two-dimensional frequency domain.

After performing S4, by multiplying the sub-aperture data converted into the two-dimensional frequency domain by a function $H_{RC} \times H_{SRC} \lambda H_{BV}$ at S5, the range compression, the secondary range compression (SRC), and the bulk range cell migration correction (RCMC) may be performed on the divided sub-aperture data. $H_{RC}$ is a function to perform the range compression, $H_{SRC}$ is a function to perform the SRC, and $H_{BV}$ is a function to perform the bulk RCMC. According to an embodiment, the range compression, the secondary range compression (SRC), and the bulk range cell migration correction (RCMC) may be performed.

First, $H_{CS}$, $H_{RC}$, $H_{SRC}$ and $H_{BV}$ may use a function corresponding to any generally known SARP core algorithm. For example, the functions proposed in "Ian G. Cumming, Frank H. Wong, Digital Processing of Synthetic Aperture Radar Data, Artech House Inc., pp. 283-322, 2005." may be used, the details of which are well known to a person skilled in the art and thus will not be redundantly described in detail herein.

Next, after performing S5, an inverse chirp-z transform may be performed on the divided sub-aperture data in the range direction, at S6. As a method for forming an image at S6, inverse chirp-z transformation (ICZT) may be used instead of the inverse FFT (IFFT). The method of the IFFT sets the sample spacings of an image by adjusting the number of samples of data in the frequency domain. However, in the IFFT method, since the number of samples is integer and can only be set discontinuously, there is a constraint that the sample spacings are also adjusted discontinuously. In the case of the SAR operational mode in which observation is performed with multiple beams, there is a high possibility that the sample spacings between formed images of the beams differs even by a very small value. When such images of multiple beams are simply mosaicked, the quality of the entire scene image is lowered. As the image size becomes larger, the distortion of the location information becomes greater. When the interpolation function is applied to solve this problem, the quality of the image is lowered and the processing time is increased due to the accuracy error of the interpolation itself. Therefore, according to an embodiment, by using the inverse chirp-z transform method capable of continuously adjusting the sample spacings, the accuracy of the positions or values of the pixels during image formation may be secured to the maximum for any SAR system.

At S6, the inverse chirp-z transform may be performed by Equation 1 below, and may perform a function of inverse transforming any input signal in the frequency domain into a signal in the time domain.

$$x_k = W^{\frac{k^2}{2}} \cdot \left[ FFT \left\{ IFFT\{Y_n\} \cdot IFFT \left\{ W^{-\frac{n^2}{2}} \right\} \right\} \right], \quad \text{[Equation 1]}$$

$$k = 0, 1, \ldots, M - 1$$

$$Y_a = X(z_n) \cdot B^n \cdot W^{\frac{n^2}{2}}, \quad n = \frac{F_n}{\Delta F}$$

$$B = B_0 \cdot \exp(j2\pi\theta_0) \cdot \theta_0 = \Delta F \cdot t_0$$

$$W = W_0 \cdot \exp(j2\pi\phi_0) \cdot \phi_0 = \Delta F \cdot \Delta t$$

where, $X(z_n)$ is a signal in the input frequency domain, M is the number of output sample signals, $\Delta F$ is frequency spacings of the input spectrum signals, and $B_0$ and $W_0$ are amplitude constants. The start time of the signal $x_k$ on the output time is set to $t_0$, and the time spacing of the samples is set to $\Delta t$.

Next, at S7, with respect to the inverse chirp-z transformed sub-aperture data at S6, the predetermined first function $H_4$ for the residual phase correction and azimuth scaling may be multiplied by the sub-aperture data that is inverse chirp-z transformed in the range direction at S6.

At S7, accurate azimuth matched filtering is performed on the sub-aperture data inverse chirp-z transformed in the range direction by the first function $H_4$, and a quadratic phase signal is formed by using $K_{scl}(r)$ corresponding to the actual azimuth Doppler rate component.

Next, at S8, the inverse fast Fourier transform (IFFT) may be performed on the divided sub-aperture data in the azimuth direction. Through S8, the sub-aperture data may be converted from the range Doppler domain into the SAR signal domain.

After S1 to S8 are all performed on the sub-aperture data divided from the SAR raw data, the divided sub-aperture data may be recombined at S9. When the SAR raw data is processed as one sub-aperture data at S1, S1 to S8 may be performed only once.

Thereafter, the data recombined at S9 (hereinafter, "recombined data") may be multiplied by a second function $H_5$ to perform deramping at S10.

Next, at S11, FFT may be performed on the deramped recombined data at S10 in the azimuth direction, and azimuth antenna pattern compensation may be performed.

Next, at S12, IFFT may be performed in the azimuth direction on the FFT-processed recombined data in the azimuth direction at S11.

Thereafter, the IFFT-processed recombined data in the azimuth direction at S12 may be multiplied by a third function $H_6$ to perform deramping at S13.

Then, at S14, the FFT may be performed in the azimuth direction on the deramped recombined data at S13.

Next, at S15, the azimuth compression (AC) may be performed by multiplying the FFT-processed recombined data in the azimuth direction at S14 by a fourth function $H_7$.

Thereafter, at S16, the inverse chirp-z transform in the azimuth direction may be performed on the recombined data compressed in the azimuth direction at S16.

Finally, at S17, the inverse chirp-z transformed recombined data in the azimuth direction at S16 may be multiplied by a fifth function $H_8$ for phase preservation to generate single look complex (SLC) data.

Hereinbelow, the first function $H_4$, the second function $H_5$, the third function $H_6$, the fourth function $H_7$, and the fifth function $H_8$ used in the SARP core algorithm according to the present invention and the constraints to accurately process the SAR raw data in every SAR operational mode are described in detail.

The first function $H_4$ is defined by Equation 2, the second function $H_5$ is defined by Equation 3, the third function $H_6$ is defined by Equation 4, the fourth function $H_7$ is defined by Equation 5, and the fifth function $H_8$ is defined by Equation 6.

$$H_4(f_a, r) = M_1(w_\eta) \cdot \exp\left[ -j \frac{\pi}{K_{scl}(r)} f_a^2 \right] \quad \text{[Equation 2]}$$

where, $$K_{scl}(r) = -\frac{2v_{eff}^2(r)}{\lambda r_{scl}(r)},$$

$$r_{scl}(r) = r,$$

$$M_1(w_\eta) = \exp[j\{2(2\pi/\lambda + w_r/c)R_{r,2}(\eta^*) + w_\eta \eta^*\}],$$

$$R_{r,2}(\eta) = c_4\eta^4 + (c_3 + 4c_4t_1)\eta^3 + (c_2 + 3c_3t_1 + 6c_4t_1^2)\eta^2$$

where, $\lambda$ is the wavelength with respect to the center frequency of the transmission signal forming the beam, r is the closest approach range, $f_a$ is the azimuth Frequency (Doppler Frequency shift), $v_{eff}$ is the effective velocity, $K_{scl}(r)$ is a scaling Doppler rate, and $c_2$, $c_3$ and $c_4$ are coefficients. According to an embodiment, $c_2$, $c_3$ and $c_4$ are obtained by using geometry including orbit information and attitude information of a satellite.

$$H_5(t_a, r) = \exp[-j\pi K_{rot\_geometry} \cdot (t_a - t_{mid})^2] \quad \text{[Equation 3]}$$

where, $t_a$ is the azimuth time, $t_{mid}$ is the azimuth time of the selected derotation center, and $r_{rot\_geometry}$ is the distance to the beam rotation center given by geometry.

$$K_{rot1} = K_{rot\_geometry} = -\frac{2v_{eff}^2(r)}{\lambda r_{rot\_geomtry}}$$

is an azimuth derotation Doppler rate.

$$H_6(t_a, r) = \exp[-j\pi(K_{rot2}(r) - K_{rot\_geometry}) \cdot (t_a - t_{mid})^2] \quad \text{[Equation 4]}$$

$$K_{rot2}(r) = -\frac{2v_{eff}^2(r)}{\lambda r_{rot2}(r)}$$

is the azimuth deramping Doppler rate, and $$r_{rot2}(r) = r \cdot \varepsilon.$$

$$H_7(f_a, r) = W(f_a) \cdot \exp\left[j\frac{\pi}{K_{eff}(r)} f_a^2\right] \quad \text{[Equation 5]}$$

where, $$K_{eff}(r) = K_{scl}(r) - K_{rot2}(r)$$

$$H_8(t_a, r) = \exp\left[j\pi K_t(r) \cdot \left(1 - \frac{1}{\varepsilon}\right)^2 \cdot (t_a - t_{mid})^2\right] \quad \text{[Equation 6]}$$

where, $$K_t(r) = -\frac{2v_{eff}^2(r)}{\lambda \cdot r(\varepsilon - 1)}$$

According to an embodiment, by adjusting $\varepsilon$, processing the SAR raw data using the first function $H_4$, the second function $H_5$, the third function $H_6$, the fourth function $H_7$, and the fifth function $H_8$ can be applied to all modes of the SAR system, i.e., stripmap, ScanSAR, TOPS, and sliding spotlight, staring spotlight, and any operational mode between sliding spotlight and staring spotlight.

Hereinbelow, a method for adjusting $\varepsilon$ will be described in detail.

Among the five constraints described with reference to the conventional BAS system, some constraints are not applicable in the SARP core algorithm according to the present invention. Specifically, since the SARP core algorithm of the present invention performs the azimuth spectral length extension FFT for each sub-aperture, the condition that the azimuth bandwidth after derotation should satisfy the Nyquist criteria, which is the first constraint of the conventional BAS, is not applicable. The constraint in which the Doppler rate after the second derotation should have a proper large value other than '0' is applicable. In addition, since the pixel spacings may be freely adjusted by using ICZT instead of IFFT for image formation in the SARP core algorithm according to the present invention, the condition that the azimuth pixel spacings of the processed image should not be too small compared to the azimuth resolution, which is the third constraint of the conventional BAS, is not applicable. The fourth constraint in which the azimuth time range of the azimuth scene should not be increased too much is not applicable. Since the SARP core algorithm of the present invention leaves a quadratic component of the actual azimuth signal when performing azimuth scaling, the condition that the time shift of the azimuth signal by $H_4$ should not be too large, which is the fifth constraint of the BAS, is not applicable.

Therefore, the constraints of the present invention may be simplified as follows.

Firstly, the Doppler rate after the derotation should have a proper large value other than '0'. Secondly, the azimuth time range of the azimuth scene should not be increased too much.

The azimuth bandwidth after deramping may be represented by Equation 7 below.

$$B_{a\_Total\_Span} = \quad \text{[Equation 7]}$$
$$\frac{2v_{eff}^2(r)}{r \cdot \lambda} \cdot \left\{\left|\left(\frac{1}{\varepsilon} - \frac{r}{r_{rot\_geometry}}\right) \cdot T_a\right| + \left|\left(1 - \frac{1}{\varepsilon}\right) \cdot T_{abs}\right| + B_{FOV}\right\}$$

$B_{FOV}$: Doppler frequency range of the data in instant field of view $$B_{FOV} = \frac{2 \cdot v_a \cdot \theta_{ax}}{\lambda}$$

The first constraint according to the present invention described above requires that the second component $$\frac{2v_{eff}^2(r)}{r \cdot \lambda} \cdot \left|\left(1 - \frac{1}{\varepsilon}\right) \cdot T_{abs}\right|$$

in Equation 7 have a proper value greater than 0.

Further, the second constraint requires that the following conditions be met.

$$\left|\frac{\varepsilon}{\varepsilon - 1}\right| \cdot \Delta t_{a0} < \gamma_1 \cdot T_a$$

$T_a$: total observation time
$\Delta t_{a0}$: azimuth time length for scene size
$\gamma_1 > \gamma_1$: ratio of azimuth time range compared to Ta, on which scene would appear after application of $H_7$ and azimuth ICZT.

For example, γ=1.25 may be set. However, in the case of ScanSAR mode and TOPS mode, the second constraint may not be applied for the operation purpose and characteristics.

Meanwhile, in order to satisfy the above two constraints, the SARP core algorithm according to the present invention may set E appropriately for each operational mode.

When the SAR operational mode is Stripmap, ScanSAR and TOPS mode, $$\varepsilon = \frac{r_{rot\_geometry}}{r_{mid}}$$

may be set.

However, when the SAR operational mode is Stripmap or ScanSAR, the following may be set.

If the value of $r_{rot\_geometry}$ cannot be calculated numerically, $r_{rot\_geometry}=1000 \cdot r_{mid}$, if $|r_{rot\_geometry}|>1000 \cdot r_{mid}$ and $r_{rot\_geometry}>0$, $r_{rot\_geometry}=1000 \cdot r_{mid}$, if $|r_{rot\_geometry}|>1000 \cdot r_{mid}$ and $r_{rot\_geometry}<0$, $r_{rot\_geometry}=-1000 \cdot r_{mid}$, and if $|r_{rot\_geometry}| \leq 1000 \cdot r_{mid}$, the calculated $r_{rot\_geometry}$ value can be applied as is.

Here, $r_{mid}$ is the closest distance to the center of the scene.

Meanwhile, when the SAR operational mode is the spotlight operational mode including the sliding spotlight and the staring spotlight, E may be set by the following equation.

$$\varepsilon_{optimized} = \frac{\varepsilon_{min\_\gamma_1,\gamma_2} + \varepsilon_{max\_\gamma_1,\gamma_2}}{2}$$

$\varepsilon_{min\_\gamma_1,\gamma_2}$, $E_{max\_\gamma_1,\gamma_2}$ may be defined as an upper limit and a lower limit of ε that satisfy both Conditional Equation 1 and Conditional Equation 2 below.

$$\varepsilon_{min\_\gamma_1} < \varepsilon < \varepsilon_{max\_\gamma_1} \quad \text{[Conditional Equation 1]}$$

For Conditional Equation 1, in $$\varepsilon = 1 + \frac{\Delta t_{ao}}{\gamma_1 T_a - \Delta t_{ao}}, \gamma_1 > 0,$$

it may be calculated as E range that is calculated for values of $\gamma_1$ range such as $$\frac{\Delta t_{a0}}{T_a} < \gamma_1 < 1.25.$$

$$\varepsilon_{min\_\gamma_2} < \varepsilon < \varepsilon_{max\_\gamma_2} \quad \text{[Conditional Equation 2]}$$

For Conditional Equation 2, in $$\varepsilon = \frac{v_{eff}(r_{mid}) \cdot T_{obs}}{v_{eff}(r_{mid}) \cdot T_{obs} - \gamma_2 \cdot \theta_{az} \cdot r_{mid}}, \gamma_2 > 0,$$

it may be calculated as E range that is calculated for vale $\gamma_2$ range such as $$1 < \gamma_2 < 0.75 \cdot \frac{B_{a\_Target}}{B_{FOV}}.$$

Here, $$B_{a\_Target} = \frac{2v_{eff}^2(r_{mid})}{\lambda r_{mid}} \cdot T_{obs}$$

$T_{obs}$ and $T_{obs}$ is the target observation duration (Target dwell time).

The embodiments described above may be implemented as a hardware component, a software component, and/or a combination of a hardware component and a software component. For example, the devices, methods, and components described in the embodiments may be implemented by using one or more general computer or specific-purpose computer such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, although it may be described that one processing device is used, one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, computer storage medium or device, or signal wave transmission, permanently or temporarily. The software may be distributed over networked computer systems and stored or executed in a distributed manner. The software and data may be stored on one or more computer-readable recording media.

The method according to the embodiment may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in an order different from the described method, and/or even when the components of the system, structure, device, circuit, and the like are coupled or combined in a form different from the way described, or replaced or substituted by other components or equivalents, an appropriate result can be achieved.

What is claimed is:

1. A method for processing synthetic aperture radar image (SAR) raw data, the method comprising:
    dividing the SAR raw data into one or more sub-aperture data by a predetermined number in an azimuth direction;
    performing a spectral length extension fast Fourier transform (FFT) on the divided sub-aperture data in the azimuth direction;
    multiplying the divided sub-aperture data by a chirp scaling function;
    performing the FFT on the divided sub-aperture data in a range direction;
    performing a range compression, a secondary range compression (SRC), and a bulk range cell migration correction (RCMC) on the divided sub-aperture data;
    performing an inverse chirp-z transform on the divided sub-aperture data in the range direction;
    multiplying the divided sub-aperture data by a first function predetermined for residual phase correction and azimuth scaling;
    performing an inverse fast Fourier transform (IFFT) on the divided sub-aperture data in the azimuth direction;
    recombining the divided sub-aperture data;
    multiplying the recombined data by a second function to perform deramping;
    performing the FFT on the recombined data in the azimuth direction;
    performing the IFFT on the recombined data in the azimuth direction;
    multiplying the recombined data by a third function to perform deramping;
    performing the FFT on the recombined data in the azimuth direction;
    performing an azimuth compression by multiplying the recombined data by a fourth function;
    performing the inverse chirp-z transform in an azimuth direction on the recombined data; and
    multiplying the recombined data by a fifth function for phase preservation,
    wherein the first function is defined by Equation 2, the second function by Equation 3, the third function by Equation 4, the fourth function by Equation 5, and the fifth function by Equation 6 as follows:

$$H_4(f_a, r) = M_1(w_\eta) \cdot \exp\left[-j\frac{\pi}{K_{scl}(r)} f_a^2\right] \quad \text{[Equation 2]}$$

where, $$K_{scl}(r) = -\frac{2v_{eff}^2(r)}{\lambda r_{scl}(r)},$$

$$r_{sc1}(r) = r;$$

$$M_1(w_\eta) = \exp[j\{2(2\pi/\lambda + w_r/C)R_{r2}(\eta^*) + w_\eta \eta^*\}],$$

$$R_{r2}(\eta) = c_4 \eta^4 + (c_3 + 4c_4 t_1)\eta^3 + (c_2 + 3c_3 t_1 + 6c_4 t_1^2)\eta^2$$

where, $\lambda$ is a wavelength with respect to a center frequency of a transmission signal forming a beam, r is a closest approach range, $f_a$ is an azimuth frequency (Doppler Frequency shift), $v_{eff}$ is an effective velocity, $K_{sc1}(r)$ is a scaling Doppler rate, and $c_2$, $c_3$ and $c_4$ are coefficients obtained from geometry including orbit information and attitude information of a satellite;

$$H_5(t_a, r) = \exp[-j\pi K_{rot\_geometry} \cdot (t_a - t_{mid})^2] \quad \text{[Equation 3]}$$

where, $t_a$ is an azimuth time, $t_{mid}$ is an azimuth time of a selected derotation center, and $r_{rot\_geometry}$ is a distance to a beam rotation center given by geometry, $$K_{rot1} = K_{rot\_geometry} = -\frac{2v_{eff}^2(r)}{\lambda r_{rot\_geomtry}}$$

is an azimuth derotation Doppler rate;

$$H_6(t_a, r) = \exp[-j\pi(K_{rot2}(r) - K_{rot\_geometry}) \cdot (t_a - t_{mid})^2] \quad \text{[Equation 4]}$$

where $$K_{rot2}(r) = -\frac{2v_{eff}^2(r)}{\lambda r_{rot2}(r)}$$

is an azimuth deramping Doppler rate, and $$r_{rot2}(r) = r \cdot \varepsilon;$$

$$H_7(f_a, r) = W(f_a) \cdot \exp\left[j\frac{\pi}{K_{eff}(r)} f_a^2\right] \quad \text{[Equation 5]}$$

where, $K_{eff}(r) = K_{act}(r) - K_{rot2}(r)$; and $$H_8(t_a, r) = \exp\left[j\pi K_t(r) \cdot \left(1 - \frac{1}{\varepsilon}\right)^2 \cdot (t_a - t_{mid})^2\right] \quad \text{[Equation 6]}$$

where, $K_t(r) = -\frac{2v_{eff}^2(r)}{\lambda \cdot r(\varepsilon - 1)}.$ wherein when a SAR operational mode is a spotlight operational mode including a sliding spotlight and a staring spotlight, $\varepsilon$ is set by the following equation:

$$\varepsilon_{optimized} = \frac{\varepsilon_{min\_\gamma_1,\gamma_2} + \varepsilon_{max\_\gamma_1,\gamma_2}}{2}$$

where $\varepsilon_{min\_\gamma_1,\gamma_2}$, $\varepsilon_{max\_\gamma_1,\gamma_2}$ are defined as an upper limit and a lower limit of E that satisfy both Conditional Equation 1 and Conditional Equation 2 below:

$$\varepsilon_{min\_\gamma_1} < \varepsilon < \varepsilon_{max\_\gamma_1}, \quad \text{[Conditional Equation 1]}$$

wherein, Conditional Equation 1 is calculated as an $\varepsilon$ range that is calculated for values of a $\gamma_1$ range defined as $$\frac{\Delta t_{a0}}{T_a} < \gamma_1 < 1.25 \text{ in } \varepsilon = 1 + \frac{\Delta t_{ao}}{\gamma_1 T_a - \Delta t_{ao}}, \gamma_1 > 0;$$

and $$\varepsilon_{min\_\gamma2} < \varepsilon < \varepsilon_{max\_\gamma2}, \quad \text{[Conditional Equation 2]}$$

wherein
Conditional Equation 2 is calculated as an $\varepsilon$ range that is calculated for values of a $\gamma_2$ range defined as $$1 < \gamma_2 < 0.75 \cdot \frac{B_{a\_Target}}{B_{FOV}} \text{ in } \varepsilon = \frac{v_{eff}(r_{mid}) \cdot T_{obs}}{v_{eff}(r_{mid}) \cdot T_{obs} - \gamma_2 \cdot \theta_{az} \cdot r_{mid}},$$

$$\gamma_2 > 0, \text{ where, } B_{a\_Target} = \frac{2v_{eff}^2(r_{mid})}{\lambda r_{mid}} \cdot T_{obs}$$

where $$B_{a\_Target} = \frac{2v_{eff}^2(r_{mid})}{\lambda r_{mid}}.$$

$T_{obs}$ and $T_{obs}$ is a target observation duration (Target dwell time).

* * * * *